United States Patent [19]

Kiyama et al.

[11] Patent Number: 4,759,388

[45] Date of Patent: Jul. 26, 1988

[54] REINFORCED ACRYLIC RUBBER HOSE

[75] Inventors: Kazuhiko Kiyama, Ama; Koichi Takano, Ichinomiya, both of Japan

[73] Assignee: Toyoda Gosei Co., Ltd., Nishikasugai, Japan

[21] Appl. No.: 2,921

[22] Filed: Jan. 13, 1987

[30] Foreign Application Priority Data

Jan. 17, 1986 [JP] Japan ............... 61-008439

[51] Int. Cl.⁴ .................................... F16L 11/08
[52] U.S. Cl. ......................... 138/130; 138/126; 138/137; 138/174
[58] Field of Search ............... 138/129, 125, 126, 124, 138/127, 130, 133, 138, 137, 174

[56] References Cited

U.S. PATENT DOCUMENTS

| 790,906 | 5/1905 | Marks | 138/130 |
|---|---|---|---|
| 2,047,770 | 7/1936 | Davis | 138/130 |
| 2,151,307 | 3/1939 | Smith | 138/133 |
| 2,515,929 | 7/1950 | Ofeldt | 138/138 X |
| 2,690,769 | 10/1954 | Brown | 138/126 X |
| 3,242,691 | 3/1966 | Robinson et al. | 138/130 X |
| 3,790,419 | 2/1974 | Atwell et al. | 138/130 X |
| 3,866,632 | 2/1975 | Schaffer | 138/130 X |
| 3,924,632 | 12/1975 | Cook | 138/130 X |
| 3,977,440 | 8/1976 | Phillippi | 138/130 X |
| 4,238,260 | 12/1980 | Washkewicz | 138/130 X |
| 4,273,160 | 6/1981 | Lowles | 138/130 X |
| 4,516,972 | 5/1985 | Samson | 138/130 X |
| 4,553,568 | 11/1985 | Piccoli et al. | 138/125 |

FOREIGN PATENT DOCUMENTS

| 54076 | 10/1974 | Australia . |
| 86499 | 7/1979 | Australia . |
| 201981 | 9/1986 | Japan . |

Primary Examiner—James E. Bryant, III
Attorney, Agent, or Firm—Cushman, Darby & Cushman

[57] ABSTRACT

A hose for transport of fluid such as oil for a cooling system of an engine oil cooler, a torque converter oil cooler, etc. and oil for an oil lubrication system of a vacuum pump that are used in automobiles, aircraft, etc., and the hose comprises an inner tube of acrylic rubber; a reinforcement ply including lower yarns spirally wound on the outside surface of aforesaid inner tube such that the size of mesh will be 0.5 mm or more, and upper yarns spirally wound on said lower yarns and an outer tube of acrylic rubber laminated over the outside surface of aforesaid inner tube through said reinforcement ply, aforesaid inner tube and aforesaid outer tube being directly bonded by vulcanization through the meshes of said reinforcement ply.

4 Claims, 2 Drawing Sheets

REINFORCED ACRYLIC RUBBER HOSE

BACKGROUND OF THE INVENTION

1. Field of the Invention

The present invention relates to hoses for transporting a fluid such as oil in a cooling system of an engine oil cooler, torque converter oil cooler, etc. or oil in an oil lubrication system for a vacuum pressure that are used in automobiles, aircraft, etc.

2. Description of the Prior art

This type of hoses known in the prior art, as shown in FIG. 3, comprises a tube section 21 of acrylic rubber and a braid structure 25 formed by closely winding on the outside surface of the tube section 21 a plurality of reinforcement yarns 24 of synthetic fibers such as polyethylene terephthalate (PET), vinylon, etc.

SUMMARY OF THE INVENTION

The hoses of the aforesaid construction, however, have the following problems that the braid structure 25, being exposed, is liable to impairment; the tube section 21 and the reinforcement yarns 24 have a relatively small contact surface and accordingly as they have low bonding strength, the reinforcement yarns 24 are easy to move; and furthermore the reinforcement yarns 24 are liable to heat deterioration where hot oil such as engine oil passes through in the aforesaid hoses.

Furthermore, the aforesaid hoses have the problem that the number of turns of the reinforcement yarns 24, namely the number of turns of the reinforcement yarns 24 per unit length of hose is necessarily increased in order to meet requirements as to its appearance and molding, with the result that the hose itself is hard to bend and is difficult to bend for forming.

Furthermore, there has been a problem that when the hose is provided with a clamp (not illustrated), the reinforcement yarns 24 come in direct contact with the clamp and therefore will easily come to be permanently set or cut, resulting in easy deterioration of sealing properties of the area where the clamp is installed.

It will therefore be considered that the same kind of acrylic rubber as the tube section 21 is laminated on the outside surface of the tube section 21 through the aforesaid braid structure 25, but it has been found, as a result of the covering of the tube section 21 with the outer tube of acrylic rubber through the braid structure 25 having meshes of ordinary size in accordance with conventional general knowledge, that the both tubes can not be easily bonded and require an adhesive.

Researches have been made for an adhesive capable of improving the adhesion of the both tubes, but any good adhesive has not yet been placed on the market.

It therefore has been necessary to manufacture hoses that the both tubes are able to jointed without using any adhesive. And doing so can dispense with the adhesive itself as well as adhesive application process.

The object of the present invention is to provide a hose which solves the aforesaid problems of aforesaid prior-art hoses and also enables the use of acrylic rubber as an outer tube without using an adhesive. Another object of the present invention is to provide a hose which is free from torsion when applied with a pressure, and is hard to be subjected to buckling when there is a difference in elongation percentage between the lower yarns and upper yarns that constitute the reinforcement ply.

The hose of the present invention comprises an inner tube of acrylic rubber, a reinforcement ply including lower yarns spirally wound on the outside surface of the inner tube such that the size of the mesh will be 0.5 mm and more upper yarns spirally wound on the lower yarns, and an outer tube of acrylic rubber laminated over the outside surface of the inner tube through the reinforcement ply, the inner tube and the outer tube being directly jointed by vulcanization through the meshes of the reinforcement ply.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF A PREFERRED EMBODIMENT

Figure 1:
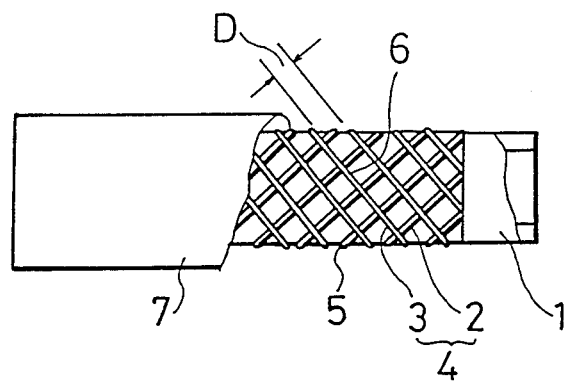
FIG. 1 is a partly cutaway side elevation of the end of a hose.

For the upper yarns and lower yarns (collectively termed "reinforcement yarns") which constitute the aforesaid reinforcement ply, aliphatic polyamide, rayon or vinylon are usable beside PET and aromatic polyamide. The upper yarns and the lower yarns may be the same one or of the same type or of a different type. The same type or the different type is usable but physical properties such as elongation pecentage or strength are preferably different.

For example, the elongation percentage of the lower yarns can be increased 1.1 to 3 times greater than that of the upper yarns, preferably about 1.5 times greater. An example is a combination of vinylon and polyester. The elongation percentage stated herein is intermediate extension (elongation at fixed load applied).

Also, the strength of the upper yarns can be made 1.1 to 3 times greater than that of the lower yarns, preferably about twice greater. An example is a combination of vinylon and polyester. The strength stated herein is a modulus (load at fixed elongation).

The mesh of the aforesaid reinforcement ply, namely a distance D between adjacent reinforcement yarns, must be 0.5 mm or more. The more preferable maximum value of the distance D is 5 mm. Within this range, the number of turns of the reinforcement yarns increases, enabling the reinforcement yarns to fully display their function.

For the aforesaid acrylic rubber is usable an elastomeric body which comprises acrylic acid lower alkyl ester alone, or the ester as a main component polymerized with copolymerizable monomer under the presence of a crosslinking agent.

As the acrylic acid lower alkyl ester, beside acrylic acid ethyl ester, acrylic acid methyl ester, acrylic acid n-butyl ester, and acrylic acid 2-ethyl hexyl ester are available, and also, as the monomer, vinyl monomer such as ethylene, propylene, etc., butadiene, and other diene compounds are available.

Of these chemicals, a copolymer comprising acrylic acid lower alkyl ester as a main component and ethylene as a copolymer component, or a copolymer comprising acrylic acid lower alkyl ester as a main component and ethylene and vinyl acetate as copolymer components is preferable.

For the aforesaid crosslinking agent, an acrylic acid derivative having one of carboxyl group, epoxy group and chlorine atomes, and a methacrylic acid derivative are used, and concretely speaking, epoxy compounds of glycidyl acrylate, glycidyl methacrylate, etc. and esters comprising chlorinated alcohol and acrylic acid or methacrylic acid, for example chloromethylacrylate and chloroethylacrylate are used.

The acrylic rubber used for the aforesaid inner tube and the outer tube may be either of the same type or a different type if it is within the scope of acrylic rubber. The same type of acrylic rubber is preferable because it has great bonding strength.

The bonding of the inner tube and the outer tube through the aforesaid meshes is not required to have been realized throughout the all meshes, but may have been realized commonly over 60%.

In the hose of the present invention, as the inner tube and the outer tube, as previously stated, are directly bonded by vulcanization through the meshes of the reinforcement ply, no adhesive is commonly required for the bonding of these tubes. However, when a greater bonding strength is required (particularly in this case, the mesh is in most cases relatively small, for example about 0.5 to 1 mm), an adhesive comprising acrylic rubber having carboxyl group and a solvent, and acrylic rubber latex may be subsidiarily applied between the inner tube and the outer tube. In this case, the quantity of the adhesive to used can be decreased more than that in an ordinary cases, and this vulcanizing bonding strength can be improved further.

The hose of the present invention comprises an inner tube of acrylic rubber; a reinforcement ply including lower yarns spirally wound on the outside surface of the inner tube such that the size of the meshes will be 0.5 mm or more, and upper yarns spirally wound on the lower yarns; and an outer tube of acrylic rubber laminated over the outside surface of the inner tube, the inner tube and the outer tube being directly bonded at least by vulcanization through the meshes of the reinforcement ply.

In the hose, acrylic rubber is used as rubber in the outer tube, and therefore the reinforcement yarns are protected with the outer tube and also if the hose is used for the transport of heated oil, the reinforcement yarns will not be deteriorated.

Having a reinforcement ply of coarser mesh than that of ordinary hoses, this hose can be easily bent.

Furthermore, the hose uses the same type of rubber (acrylic rubber) for the both inner tube and the outer tube and also has the reinforcement ply of a special mesh size, and therefore the rubber can be bonded easily by vulcanization through the meshes. In this hose, therefore, the adhesive for bonding the outer tube to the inner tube, a bonding process, and reinforcement yarns RFL processing are not needed.

In this hose, when this reinforcement ply in particular differs in elongation percentage and strength between the lower yarns and the upper yarns of reinforcement yarns that are each wound spirally, torsion that arises peculiarly to spiral hoses when a pressure is applied, can be restrained and, furthermore, even if the torsion is exerted, the hoses are hard to yield to buckling. This is due to the balanced elongation of the upper and lower yarns.

Having generally described this invention, a further understanding can be obtained by reference to certain specific examples which are provided herein for purposes of illustration only and are not intended to be limiting unless otherwise specified.

Figure 2:
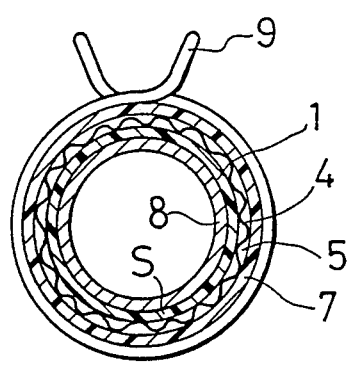
FIG. 2 is a cross sectional view showing the end of the hose fitted with a metal tube and a constant-displacement type clip.
Figure 3:
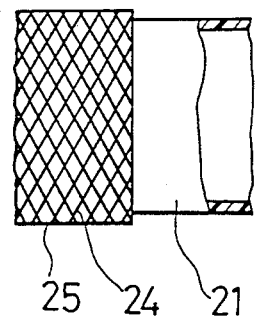
FIG. 3 is a partly cutaway side elevation of the end of a prior-art hose.

The hose related with this example, as shown in FIGS. 1 and 2, comprises an inner tube 1 (inside diameter, 7.2 mm) of acrylic rubber, a reinforcement ply 5 constitute by winding reinforcement yarns 4 on the outside surface of the inner tube 1, and an outer tube 7 (outside diameter, 14.6 mm) formed by covering the outside surface of the aforesaid inner tube 1 with acrylic rubber laminated through the reinforcement ply 5.

The acrylic rubber selected for constituting each of the inner tube 1 and the outer tube 7 is of the same composition and includes reinforcement yarns 4 which display greater resistance of deterioration to specific gases which the rubber produces during vulcanization. The acrylic rubber is an elastic body obtained through the vulcanization of acrylic acid ethyl ester as a main component with ethylene as a copolymeric component under the presence of a crosslinking agent (ester of acrylic acid and oxycarbonic acid).

For the reinforcement yarns 4 are employed doubled and twisted polyester yarns (elongation percentage: 5%, strength: 0.3 kg) for the lower yarns 2 and doubled and twisted vinylon yarns (elongation percentage: 5%, strength: 0.7 kg) for the upper yarns 3. The elongation percentage and the strength are tested in accordance with JIS L 1017. The thickness of the twisted yarns is No. 20.

The reinforcement ply 5 is formed by first spirally winding the lower yarns 2 on the outside surface of the inner tube 1 and by subsequently spirally winding the upper yarns 3 on the lower yarns 2. The meshes 6 formed in the reinforcement ply 5 is of a distance D of about 1.5 mm. The arcylic rubber of the outer tube 7 is directly bonded by vulcanization to the inner tube 1 through the meshes 6.

The hose of this construction is manufactured through the following processes.

(1) Extrusion molding process for inner tube 1

The aforesaid acrylic rubber is extruded into a form of tube, and then cooled down to the extent that the aforesaid reinforcement yarns 4 can be wound on its outside surface, thus continuously forming the aforesaid inner tube 1.

(2) Forming process for reinforcement ply 5

The lower yarns 2 are wound on the outside surface of the inner tube 1 while a plurality of bobbins wound with the lower yarns 2 are turned around the inner tube 1 with a tension being applied to the lower yarns 2.

Subsequently the upper yarns 3 are wound on the lower yarns 2 in a similar manner, forming the reinforcement ply 5. The reinforcement yarns 4 are wound such that the size of the meshes formed at this time will be of the order of 1.5 mm and that the reinforcement yarns 4 will slightly bite into the outside surface of the inner tube 1.

In the reinforcement yarns 4 used at this time, the elongation percentage of the lower yarns 2 is 1.5 times as great as that of the upper yarns 3, and the strength of the upper yarns 3 is 1.5 times as great as that of the lower yarns 2. The reinforcement yarns 4 shall be one that has not been subjected to an RFL (Resorcinol-Formaldehyde Latex) treatment which is one type of adhesive treatment for common reinforcement yarns, and dipping treatment.

(3) Forming process for outer tube 7

The outer tube 7 of the acrylic rubber is formed on the outside surface of the inner tube 1 covered with the reinforcement ply 5. This forming is accomplished by extruding the acrylic rubber by an extruder and feeding the acrylic rubber to a mandrel in which the inner tube 1 passes through, such that the inner tube 1 will be laminated with the acrylic rubber as the outer tube 7.

The acrylic rubber which will become the outer tube 7 in this process flows under the extrusion pressure of the extruder, over the acrylic rubber in the outside surface part of the inner tube 1, thus the two tubes 1 and 7 being directly bonded through the meshes 6.

(4) Vulcanization process

Finally, a green hose formed through the above-mentioned processes is passed through in water vapor, then undergoing the primary and secondary vulcanization of the acrylic rubber. The primary vulcanization is performed at 150° C. for a period of 1 hr and the secondary vulcanization at 150° C. for a period of 20 hr.

In this process the reinforcement yarns 4 shrink to bite further into the inner tube 1, improving adhesion between the reinforcement yarns 4 and the acrylic rubber and, at the same time, vulcanizing the arcylic rubber to bond between the inner tube 1 and the outer tube 7.

In a hose thus obtained, the outer tube 7 protects the reinforcement ply 5 and therefore the reinforcement yarn 4 will be neither impaired nor broken.

Furthermore, since the hose thus obtained in this example uses specific acrylic rubber for the inner tube 1 and the outer tube 2 and the reinforcement ply 5 is protected with the outer tube 7, the reinforcement yarns 4 will not be deteriorated if the hose is used for the transport of engine oil or others of relatively high temperatures. For example, when the aforesaid upper yarns and lower yarns are used as the reinforcement yarns 4, the rate of decrease in pressure resistance indicating the degree of deterioration of the reinforcement yarns 4 can be held under 50%.

The rate of decrease in pressure resistance is a parameter showing heat deterioration, and, concretely speaking, a rate of decrease in an initial burst pressure (before heat treatment) obtained when a pressure is applied to a hose of 7.2 mm inside diameter after leaving in a 150° C. atmosphere for a period of 70 hr.

Since the meshes 6 of the reinforcement ply 5 is larger than that of ordinary hoses, the hose obtained in this example is easy to bend and the inner tube 1 and the outer tube 7 are bonded firmly without any adhesive and further without the reinforcement yarns 4 being subjected to the RFL treatment and the dipping treatment.

Furthermore, the reinforcement yarns 4 will be neither permanently set nor broken when a joint area is formed by connecting a metal tube 8 to the end of the hose and a constant-displacement type clip 9 is mounted on the outside surface of the hose 5. Consequently, the sealing properties at the sealing section S of the hose will be maintained.

Figure 4:
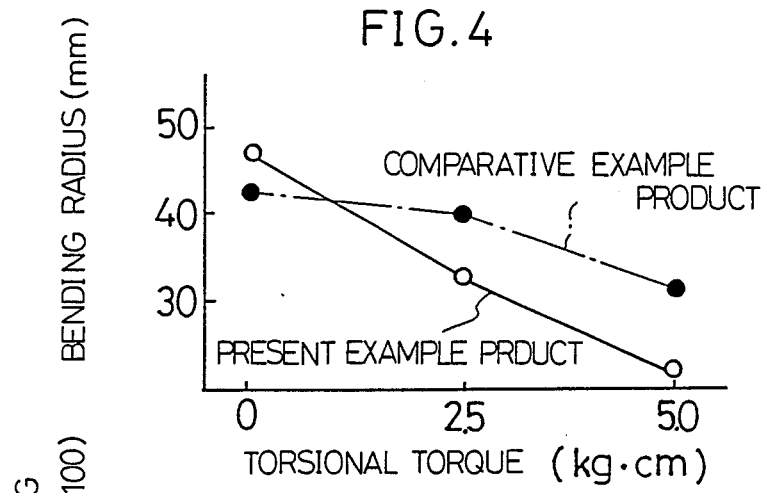
FIG. 4 is a graph showing a relationship of torsional torque and bending radius between the present example product and a comparative example product.
Figure 5:
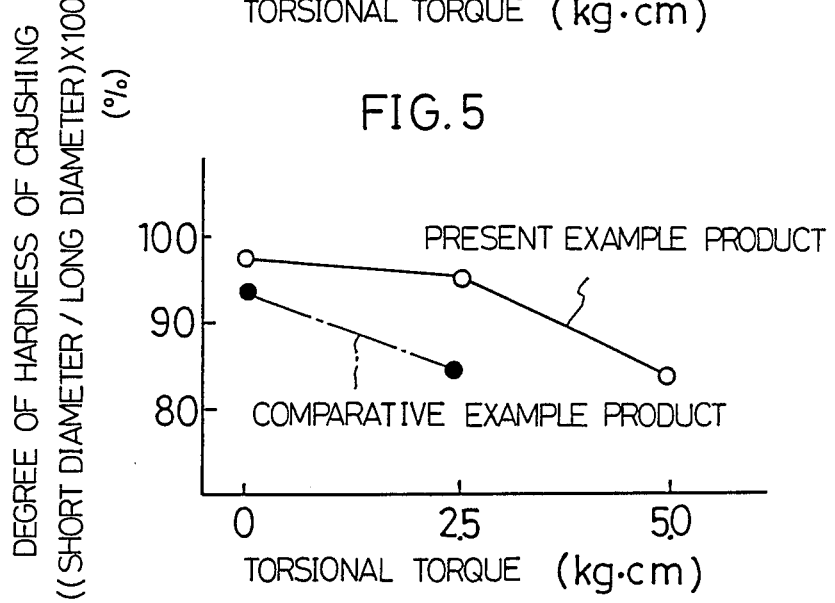
FIG. 5 is a graph showing a relationship of the torsional torque and a degree of hardness of crushing ((short diameter/long diameter)×100) between the present example product and the comparative example product.

In this hose, a test was conducted as to the relation between a torsional torque and blockage (angle of torsion and degree of crush). Its result is as shown in FIGS. 4 and 5. A comparative example product has a reinforcement ply comprising twill fabric and the others are of the same material as a present example product. The reinforcement yarns used for this twill fabric is polyester.

According to this result, the present example product, as shown in FIG. 4, is of little bending radius as compared with the comparative example product when the torsional torque is 2.5 and 5.0 kg.cm, and accordingly is easy to bend at the time of application of pressure. Also, as shown in FIG. 5, the present example product is hard to be crushed, regardless of the presence or absence of the torsional torque, as compared with the comparative example product. The present example product, therefore, is easy to bend as compared with the comparative example product, can restrain the torsion at the time of pressure application, and, furthermore, is hard to be subjected to buckling when added with torsion.

The bending radius was measured with an R gage after the application of a specific torsional torque. This hardness of crushing was evaluated, after the application of sepecific torsional torque, as a value 100 times the ratio of a short diameter to a long diameter of the hose.

Having now fully described the invention, it will be apparent to one of ordinary skill in the art that many changes and modifications can be made thereto without departing from the spirit or scope of the invention as set forth herein.

What is claimed is:

1. A reinforced acrylic rubber hose comprising:
an inner tube of acrylic rubber;
a reinforcement ply including lower yarns spirally wound on the outside surface of said inner tube that the size of mesh will be 0.5 mm or more, the upper yarns spirally wound on said lower yarns, the elongation percentage of said lower yarns being 1.1 to 3 times the elongation of said upper yarns and the strength of said upper yarns being 1.1 to 3 times the strength of said lower yarns; and
an outer tube of acrylic rubber laminated over said outside surface of said inner tube through said reinforcement ply, said inner tube and said outer tube being directly bonded at least by vulcanization through meshes of said reinforcment ply, using a crosslinking agent of an acrylic acid derivative or a methacrylic acid derivative, having any one of a carboxyl group, an epoxy group, and chlorine atoms.

2. A reinforced acrylic rubber hose as claimed in claim 1 wherein said acrylic rubber comprises lower alkyl ester as a main component and ethylene as a copolymer component which are polymerized under the presence of a crosslinking agent.

3. A reinforced acrylic rubber hose as claimed in claim 1 wherein said acrylic rubber comprises acrylic acid lower alkyl ester as a main component and ethylene and vinyl acetate as copolymer components which are polymerized under the presence of a crosslinking agent.

4. A reinforced acrylic rubber hose as claimed in claim 1, wherein said lower yarns are polyethylene terephthalate fibers and said upper yarns are vinylon or aromatic polyamide fiber.

* * * * *